(12) United States Patent
Benedetto et al.

(10) Patent No.: US 8,921,693 B2
(45) Date of Patent: Dec. 30, 2014

(54) DISTRIBUTION CABINET FOR OPTICAL FIBRE CABLES

(75) Inventors: Adrian Benedetto, Berlin (DE); Oliver Hartmann, Potsdam (DE); Frank Mössner, Berlin (DE); Michael Sielaff, Erwitte (DE); Thomas Fischer, Rackwitz/Zschortau (DE)

(73) Assignee: Tyco Electronics Services GmbH, Schaffhausen (CH)

( * ) Notice: Subject to any disclaimer, the term of this patent is extended or adjusted under 35 U.S.C. 154(b) by 23 days.

(21) Appl. No.: 13/576,594

(22) PCT Filed: Nov. 2, 2010

(86) PCT No.: PCT/EP2010/006672
§ 371 (c)(1),
(2), (4) Date: Aug. 1, 2012

(87) PCT Pub. No.: WO2011/091824
PCT Pub. Date: Aug. 4, 2011

(65) Prior Publication Data
US 2013/0098677 A1    Apr. 25, 2013

(30) Foreign Application Priority Data
Feb. 1, 2010   (DE) .......................... 10 2010 006 610

(51) Int. Cl.
*H02G 3/08*   (2006.01)
*H02G 3/14*   (2006.01)
*G02B 6/44*   (2006.01)

(52) U.S. Cl.
CPC ............... *H02G 3/14* (2013.01); *G02B 6/4477* (2013.01); *G02B 6/4441* (2013.01); *G02B 6/4452* (2013.01); *Y10S 248/906* (2013.01)
USPC .............. 174/50; 439/535; 361/600; 248/906

(58) Field of Classification Search
USPC ............. 174/50; 439/535; 248/906; 361/600; 220/4.02
See application file for complete search history.

(56) References Cited

U.S. PATENT DOCUMENTS

| | | | |
|---|---|---|---|
| 4,985,962 | A | 1/1991 | Weber |
| 6,810,193 | B1 | 10/2004 | Muller |
| 7,396,997 | B2 * | 7/2008 | Dinh .............................. 174/67 |

(Continued)

FOREIGN PATENT DOCUMENTS

| | | |
|---|---|---|
| DE | 66 10 650 | 4/1975 |
| DE | 37 10 306 | 10/1988 |

(Continued)

OTHER PUBLICATIONS

International Search Report for International Application No. PCT/EP2010/006672 mailed Jan. 28, 2011.

*Primary Examiner* — Dhirubhai R Patel
(74) *Attorney, Agent, or Firm* — Merchant & Gould P.C.

(57) ABSTRACT

A box (1) for accommodating and laying optical waveguides and/or copper conductors includes at least one housing (10) and at least one cover (20). The cover (20) is attached to the housing (10) such that it can pivot and can be detached. The cover (20) has at least one receptacle for a pin element (90). The housing (10) has at least one pin element (90). The at least one pin element (90) can be displaced parallel to a pivot axis relative to the holding element (80) to move into and out of the receptacle.

16 Claims, 10 Drawing Sheets

(56) References Cited

U.S. PATENT DOCUMENTS

| | | |
|---|---|---|
| 7,418,186 B1 | 8/2008 | Grubish et al. |
| 7,732,709 B2 * | 6/2010 | Puri et al. .................. 174/50 |
| 8,567,459 B2 * | 10/2013 | Kitchen .................. 150/147 |
| 2004/0160129 A1 * | 8/2004 | Dahlberg .................. 307/116 |
| 2005/0094786 A1 * | 5/2005 | Ossa .................. 379/111 |
| 2009/0185782 A1 | 7/2009 | Parikh et al. |
| 2009/0304342 A1 | 12/2009 | Adomeit et al. |

FOREIGN PATENT DOCUMENTS

| | | |
|---|---|---|
| DE | 199 56 067 | 5/2001 |
| DE | 697 32 337 | 5/2006 |
| DE | 10 2008 027 381 | 12/2009 |
| EP | 1 109 037 | 6/2001 |
| EP | 1 203 974 | 5/2002 |
| EP | 1 333 303 | 8/2003 |
| EP | 1 870 750 | 12/2007 |

* cited by examiner

DISTRIBUTION CABINET FOR OPTICAL FIBRE CABLES

The invention relates to a box for accommodating, laying in a structured manner, and handling elements in network technology, in particular fiber-optics technology.

Boxes of this type are used in network technology, for example as distributor boxes. Said boxes serve, in particular, to protect elements used in network technology. Furthermore, said boxes serve to lay, branch or separate optical waveguides comprising, for example, bundled cores, where bundled cores can comprise a plurality of, generally 12, optical waveguides. In addition, said boxes can serve to lay, branch or separate bundled cores of bundled core cables, with bundled core cables comprising a plurality of bundled cores.

When laying and handling optical waveguides, bundled cores and/or bundled core cables, care should be taken that transmission properties of the optical waveguides are not adversely affected. In particular, care should be taken that minimum bending radii are maintained. Care should also be taken that, once laid, the position of optical waveguides or bundled cores changes as little as possible during handling, for example when working on the optical waveguides, so that the transmission properties of the optical waveguides are retained.

Boxes of this kind generally have a housing and a cover. The cover has to be opened in order to provide access to elements which are arranged in an interior of the box. When performing work in the box, an open cover, which cover is attached to the housing, may be a hindrance in this case since, in the first instance, it has to permit accessibility or be manually held in a position which permits the desired accessibility.

DE 10 2008 027 381 A1 discloses a terminal box for fiber-optic cables, comprising an at least two-part housing with a lower part and a cover, with the cover being arranged on the lower part such that it can pivot, at least one receptacle for a splice, at least one feed for a fiber-optic cable and a receptacle for a coupling, with the side faces of the cover being longer than the end faces of the cover, with a pivot bearing of the cover being arranged on an end face of the cover. The cover preferably has a latching position in the pivoted-open state. To this end, the lower part has, in the region of the end face of the cover, a cylindrical pin onto which two hinge elements are clamped, said hinge elements being arranged on the cover. The hinge elements and the cylindrical pin form a pivot bearing for the cover, with the hinge elements and the cylindrical pin being formed in such a way that they lock in place in a specific angular position. This angle is greater than 90 degrees and less than 180 degrees; this angle is preferably 90 degrees or 135 degrees.

The technical problem is that of providing a box of which the cover is connected to the housing of said box in a detachable manner, it being possible for the cover to be detached from the housing and reattached to the housing in a simple manner.

The technical problem is solved by the features of claim 1. Further advantageous embodiments of the invention can be found in the dependent claims.

The invention proposes a box for accommodating elements used in network technology.

In the text which follows, a connection designates an interlocking, force-fitting or cohesive connection. In this case, a connection may be detachable or permanent.

In this case, a connection between a first object and a second object can generally be established by an attachment element, holding element or connecting element of the first object and an attachment element or connecting element of the second object which corresponds to said attachment element, holding element or connecting element of the first object.

In the text which follows, detachable connections designate, in particular, latching connections, but also plug-type connections, screw connections and other detachable connections which a person skilled in the art suitably selects from the detachable connections of which he is aware.

With regard to a latching connection, it is assumed in the text which follows that a latching connection can be established between a latching element and a corresponding latching receptacle in a general form. The latching element and the corresponding latching receptacle are therefore specific designs of attachment or connection elements. In this case, the latching element may be in the form of, for example, a latching lug or latching tongue or in the form of a spring-action latching tongue. In this case, the latching receptacle may be, for example, a latching slot and/or a latching opening and/or a latching recess and/or a latching limb.

The proposed box serves, in particular, to accommodate and lay optical waveguides and/or copper conductors. The box comprises at least one housing and at least one cover. In this case, the housing may have a bottom face, a right-hand side face, a left-hand side face, an upper end face and a lower end face. In this case, the bottom face may be a closed face. As an alternative or in addition, a base plate can be attached to the bottom face. To this end, the bottom face can have at least one attachment element and the base plate can have at least one corresponding attachment element. Furthermore, the housing can have a housing-side part of a closure apparatus.

Furthermore, the box comprises a cover. The cover can also have a right-hand side face, a left-hand side face, an upper end face and a lower end face. Furthermore, the cover can also have a cover-side part of a closure apparatus. The box can be closed by means of the closure apparatus. The closure apparatus may be in the form of, for example, a lock and/or a lead-sealing apparatus.

In this case, the cover is attached to the housing such that it can pivot. To this end, the housing has at least one pin element. In this case, the cover can be pivoted about this pin element. The pin element is preferably arranged in a region of the upper end face of the housing. In this case, a central longitudinal axis of the pin element defines a pivot axis. In this case, the pivot axis runs parallel to the upper end side. It goes without saying that it is also feasible to arrange the pin element in the region of a further side or end face, with the pivot axis running parallel to the respective side or end face in this case.

The cover has a holding element for the pin element. The pin element can be held by means of the holding element. If the holding element of the cover holds the pin element of the housing, the cover is attached to the housing and can be pivoted about the pivot axis. In this case, the pin element and the holding element therefore fulfill two functions. Firstly, the pin element and holding element form a corresponding pair of attachment elements for attaching the cover to the housing. Secondly, the pin element and the holding element allow the cover to pivot about the pivot axis.

The connection between the pin element and the holding element is preferably a plug-type connection. In this case, the holding element can have a cylindrical hole, preferably a blind hole. A similarly cylindrical pin (pin element) can be inserted into this hole or blind hole. In this case, an outside radius of the pin is a predetermined amount smaller than an inside radius of the hole or blind hole. The predetermined amount permits the pin to rotate in the hole or blind hole. In the text which follows, this connection will be designated a pin/hole connection.

Furthermore, the holding element and/or the pin element have/has stop elements which prevent or limit movement along the pivot axis (axial movement) of the holding element relative to the pin element. If the holding element is designed as a blind hole, a bottom face of the blind hole forms a stop element.

Furthermore, the cover is attached to the housing such that it can be detached. To this end, the pin element and the holding element therefore have to be formed in such a way that they permit detachable connection between the cover and housing.

According to the invention, the at least one pin element can be displaced parallel to the pivot axis relative to the holding element for this purpose. In the text which follows, an attached starting position of the pin element is defined as a position in which the pin element is held by the holding element. Furthermore, an unattached starting position of the holding element is defined, the pin element assuming an identical position relative to the housing as in the attached starting position in said unattached starting position, but with the pin element not being held by the holding element. In the unattached starting position, the cover is therefore not attached to the housing. Consequently, the cover is attached to the housing and can pivot about the pivot axis in the attached starting position. In the text which follows, the term starting position covers both the attached and the unattached starting position.

In this case, the pin element can be displaced out of the starting position, for example, to a second position parallel to the pivot axis relative to the holding element.

In order to displace the pin element from the starting position to the second position, either the pin element can therefore be displaced, while the holding element does not perform a displacement movement, or the holding element can be displaced, while the pin element does not perform a displacement movement.

In the text which follows, a movement of the pin element relative to the holding element is explained for the example of a moving pin element. In this case, the explained principles can also be transferred to the example of a moving holding element at the discretion of a person skilled in the art.

By way of example, the pin element can be displaced from the attached starting position to the second position, with the pin element no longer being held by the holding element in the second position. Therefore, the cover is no longer connected to the housing in the second position and can be detached or removed from said housing.

In order to attach the cover to the housing, it may be necessary, for example, for the pin element to be displaced from the unattached starting position to the second position, for the cover to be placed on the housing or to be fitted to the housing, and then for the pin element to be displaced from the second position to the attached starting position.

The housing, preferably the pin element, and/or the cover, preferably the holding element, can have stop elements which limit an axial movement of the pin element relative to the holding element to a movement between the starting position and the second position.

In the case of a pin/hole connection, the pin can therefore be displaced relative to the hole in such a way that it is no longer inserted into the hole. It is therefore feasible for either the pin to be displaced, while the hole does not perform a displacement movement, or for the hole, in particular the holding element, to be displaced, while the pin does not perform a displacement movement.

In a preferred embodiment, the proposed box has at least one spring element. In this case, the spring element can be arranged on the housing, preferably on the pin element, or on the cover, preferably on the holding element.

A restoring force can be exerted on the at least one pin element in a direction parallel to the pivot axis by means of the spring element if the at least one pin element has been displaced from the starting position of the least one pin element.

In this case, the spring element can be arranged in series or in parallel with the pin element. In the starting position of the pin element, the spring element is free of tension or pretensioned by a predetermined spring tension. If, for example, the pin element is now displaced from the starting position in the direction of the second position, a spring tension of the spring element increases, this spring tension being directed opposite to the direction of the displacement but also parallel to the pivot axis. This spring tension therefore produces the restoring force. In order to displace the pin element from the starting position, it is accordingly necessary to exert a displacement force which is greater than the spring tension of the spring element. The displacement force can be applied manually, for example. To this end, the pin element can have, for example, an operating element, it being possible for a, for example manual, force to be exerted on the pin element by means of the operating element.

If no displacement force is exerted on the pin element and said pin element is not in the starting position, the restoring force causes the pin element to be returned to the starting position.

In order to detach the cover from the housing, the pin element can therefore be displaced, against the restoring force, from the unattached starting position to the second position, and the cover can be removed or detached from the housing. If, after the cover has been removed or detached, a displacement force is no longer exerted, the pin element returns to the now unattached starting position.

In order to attach the cover to the housing, the pin element can be displaced, against the restoring force, from the attached starting position to the second position, and the cover can be placed on the housing or fitted to said housing. If, after said cover has been placed on or fitted to said housing, a displacement force is no longer exerted, the pin element returns to the now attached starting position.

In this case, placement or fitting designate positioning of the cover in relation to the housing in such a way that the pin element is held by the holding element by virtue of a purely axial movement of the pin element. In this case, a central longitudinal axis of the holding element can, in particular, be the same as a central longitudinal axis of the pin element.

In a preferred embodiment, the spring element is injection-molded onto the pin element. In this case, the spring element and the pin element are therefore formed as one component. In this case, the spring element is firmly connected to the pin element at one end of the spring element, it being possible for the rest of the spring element to move freely relative to the pin element. This advantageously results in cost-effective production of the pin element and spring element In a preferred embodiment, the holding element has means for assisting fitting of the cover. Said means may, for example, be designed in such a way that a force which is opposite the restoring force is transmitted to the pin element during the fitting process, that is to say as the cover is positioned relative to the housing, by means of the means for assisting fitting. In this case, the pin element is therefore displaced from the unattached starting position to the second position during fitting, with the displacement force being introduced into the pin element by means of the means for assisting fitting. This advantageously results in no further work, for example application of a manual force to the pin element by means of an operating element, having to be carried out in addition to positioning. This simplifies the attachment process.

The means for assisting fitting is preferably in the form of an inclined face. During fitting, this inclined face is guided along one end of the pin element such that said pin element is displaced axially into the second position against the restoring force, on account of a gradient of the inclined surface face. By way of example, the hole or blind hole can be arranged at one end of the inclined face. After the inclined face has been guided completely along the end of the pin element, a displacement force is no longer exerted on the pin element on account of the pin hole. Said pin element can snap into the hole on account of the restoring force (attached starting position).

In a further embodiment, the box has at least one holding element for at least one sealing element, it being possible for the at least one sealing element to be locked to the box by means of said holding element. In this case, the sealing element preferably serves to introduce cables, optical waveguides or bundled cores into the box. In this case, the proposed holding element firstly permits the box to be sealed off against moisture, even when, for example, cables are inserted into said box. Secondly, said proposed holding element allows fixed attachment of the sealing element and therefore also of cables, which are guided through the sealing elements, to the box. If, for example, work is carried out on the cable in or outside the box, said fixed attachment advantageously ensures that the sealing element and the cable cannot slide out of the holding element or the box.

This sealing element can preferably be locked to the box by means of a latching connection. For this purpose, the box, in particular the housing, can have latching tongues or latching lugs which latch with corresponding latching elements of the sealing element or latching receptacles in the state in which a sealing element is inserted.

The latching lugs can project, for example, perpendicularly from a bottom face of the housing. Furthermore, said latching lugs can have a thickened portion at an upper end. In this case, the latching lug is thickened from its upper end as far as a retaining edge. During insertion, the sealing element slides over the thickened portion, as a result of which the latching lug is pushed away from the sealing element, out of a starting position of the latching lug, against a spring force. If the sealing element is completely inserted, it no longer pushes the latching lug away. The spring force of the latching lug returns the latching lug to its starting position. In the process, the retaining edge slides over a surface of the sealing element, as a result of which said sealing element is clamped.

It goes without saying that other, preferably detachable, connections of the sealing element and box by means of the holding element are also feasible.

In a further embodiment, the box has at least one holding element for at least one pin holder. The at least one pin holder can be attached to a bottom face of the box, preferably in a detachable manner, by means of said holding element. The connection is preferably in the form of a latching connection.

The box can also be connected to the pin holder by means of a coupling element. In this case, the pin holder is attached to the coupling element. The coupling element has, in turn, an attachment element by means of which the coupling element can be attached to the holding element of the box for the pin holder.

In this case, the pin holder can be part of a holding means for at least one cassette. In this case, the holding means comprises the at least one cassette. In this case, the cassette serves preferably for laying optical waveguides in a structured manner. The holding means further comprises the at least one pin holder and at least one pin element. In this case, the pin element is attached to the pin holder. In this case, the pin holder can be, for example, a rectangular retaining plate. Furthermore, the cassette, in particular a term cassette or a splice cassette or a term/splice cassette, has at least one element for rotatable mounting. The elements for rotatable mounting are preferably arranged on an end side of a cassette. Furthermore, the end side of a cassette has an inlet/outlet opening for introducing optical waveguides or bundled cores into the cassette or for guiding said optical waveguides or bundled cores out of the cassette. In this case, the at least one element for rotatably mounting the cassette is preferably rotatably mounted on the pin element.

This advantageously results in it being possible for a holding means for laying optical waveguides, bundled cores and further cables in a structured manner to be attached in the box, in particular in a detachable manner.

In a further embodiment, the box has at least one apparatus for laying bundled cores. In this case, the apparatus for laying bundled cores can be of circular design, with a radius of the apparatus being at least equal to a minimum bending radius of the optical waveguides or of the bundled cores. In this case, the apparatus for laying bundled cores may be in the form of a guide rib or a guide channel. The apparatus for laying bundled cores may also be in the form of guide bodies which are raised above a base of the splice cassette.

In a further embodiment, the box has at least one attachment element for at least one cable guidance element. In this case, at least one bundled core and/or an optical waveguide with a predetermined bending radius can be guided by means of the at least one cable guidance element. Therefore, a desired profile of a bundled core or of an optical waveguide can advantageously be realized in the box while maintaining the minimum bending radius. A connection between the attachment element and the cable guidance element is preferably a latching connection. It goes without saying that other, preferably detachable, connections of the attachment element and the cable guidance element are feasible.

In a further embodiment, at least one side wall of the box, in particular a right-hand and/or left-hand side wall of the housing, has a predetermined breaking point. A predetermined portion of the side wall can be broken away from said side wall by means of the predetermined breaking point. If no portions of the side wall are broken away from said side wall, the box continues to be impermeable to, for example, moisture and dirt. By breaking away portions of the side wall by means of the predetermined breaking points, openings for guiding, for example, cables into the box or out of the box can be created in an advantageous manner. A holding element for at least one sealing element is preferably arranged adjacent to a portion of the side wall which has a predetermined breaking point. Therefore, a sealing element can advantageously be inserted into an opening and locked in said opening, as a result of which openings which can be created by predetermined breaking points can also be sealed off.

In a further embodiment, the box has at least one apparatus for holding at least one connecting element. At least one connecting element can be held in the box or attached to said box by means of the least one apparatus for holding at least one connecting element. In this case, the holding element for a sealing element additionally serves as a holding element for the connecting element. As an alternative or in addition, the box can have a separate holding element for the connecting element. By way of example, two boxes can be connected by means of the connecting element.

Preferably, at least two boxes can be lined up next to one another by means of the connecting element. To this end, a connecting element, for example, can be held by an apparatus for holding a connecting element of a first box and by an apparatus for holding a connecting element of a second box.

A connection between the apparatus for holding a connecting element and the connecting element is preferably a latching connection. It goes without saying that other, preferably detachable, connections are also feasible. The connecting element may have, for example, a connecting channel which preferably runs in the connecting element. In this case, end faces of the connecting element, for example, can have openings to the connecting channel. By way of example, cables from the first box can be guided into the second box through the connecting channel.

As an alternative, the apparatus for holding a connecting element can be arranged outside the box, for example on a lower face of the housing. In this case, the holding apparatus can serve to hold, for example, a sheet metal tongue which serves as a connecting element.

Furthermore, the box can additionally have at least one element for guiding bundled cores and/or optical waveguides. As a result, a desired profile of optical waveguides and/or bundled cores can be realized in the box.

The refinements of the various connections as detachable connections, for example the connection between the box and the sealing element or the connection between the box and the pin holder, advantageously permit modular and user-specific provision of fittings for the box, and this can be adapted to a specific use. It goes without saying that the connections can also be designed as permanent connections; however, as a result of this, the box is restricted to specific uses.

The invention will be explained in greater detail in the text which follows with reference to an exemplary embodiment. In the figures.

Figure 1:
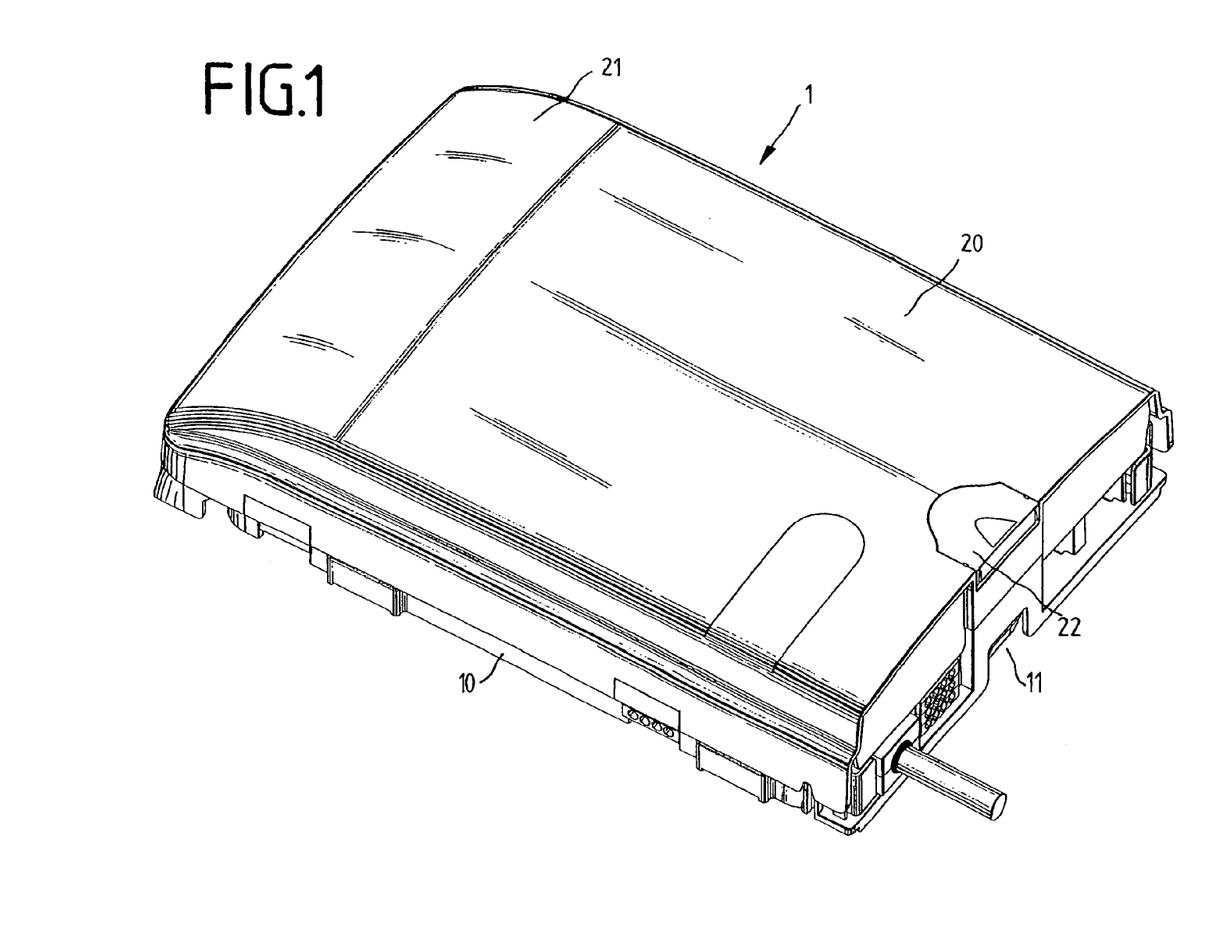
FIG. 1 shows a perspective front view of a box with the cover closed.

The box 1 for accommodating and laying optical waveguides comprises a housing 10 or lower part and a cover 20. The cover 20 is slightly curved and slopes more steeply in a rear region 21. In the front region, the cover 20 has a latching lug 23 by means of which the cover 20 can be latched to the housing 10, FIG. 2. The housing 10 has a receptacle 11 for a lock in order to lock the box 1. To this end, the cover 20 has at least one receptacle, which is concealed by the latching tab 22, in order to accommodate blocking elements of the lock. The housing 10 has various sealing elements in order to guide bundled cores, patch cord cables or optical waveguides into the box 1 without allowing dirt or moisture to penetrate. These sealing elements will be explained in greater detail below.

Figure 2:
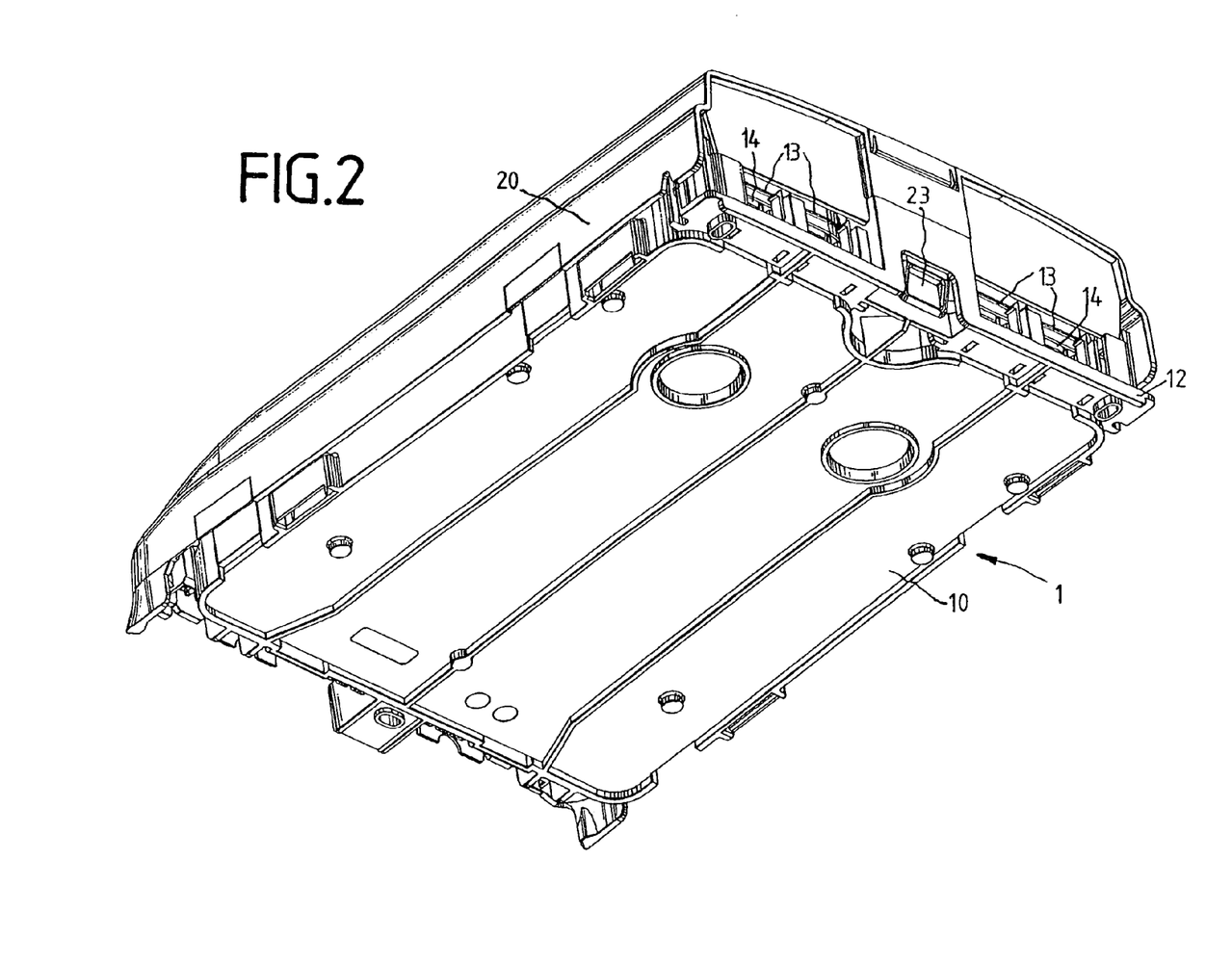
FIG. 2 shows a perspective view of the box from below.

FIG. 2 illustrates a view of the box 1 from below. Holding elements 13 (designated receptacles for short in the text which follows) for sealing elements (not illustrated) are arranged on the front end side 12 of the housing 10; said holding elements will likewise be explained in greater detail below in connection with the sealing elements. A peripheral wall 14 of the housing 10, which peripheral wall seals off the housing 10, is situated behind the receptacles 13, with predetermined breaking points being provided in the region of the receptacles 13. The peripheral wall 14 can be seen particularly clearly in FIG. 3. In this case, said figure further illustrates that in each case one sealing element 40 is inserted into the two outer receptacles 13, it being possible for bundled core cables 50 to be guided into and out of the box 1 through said sealing elements. The sealing element 40 comprises two half-shells 40a, 40b which can preferably be latched to one another. The receptacles 13 for the sealing elements 40 each comprise a latching lug 15 on one side. If a bundled core cable 50 or a bundled core is now guided into the box 1, the wall 14 will be broken away at predetermined breaking points in the region of the receptacle 13. The sealing element 40 is then placed around the bundled core cable 50, with the two half-shells 40a, 40b being latched to one another. The sealing element 40 is then pushed into the receptacle 13, with the latching lugs 15 snapping in over the sealing element 40. As a result, the seal 40 is stably latched to the housing 10. Furthermore, the housing 10 comprises a plurality of receptacles 13 which are arranged on the sides 17, 18 and of which the function will be explained in greater detail below. For defined laying of the bundled cores 51, the protective sheath of the bundled core cable 50 is partially removed and the individual bundled cores 51 are wound around the deflection elements 16. In order to maintain the minimum bending radius, the bundled cores 51 are then guided behind a coupling element 70 and guided forward again in the direction of end side 12, and then guided out of the box 1 through the other seal 40 as bundled core cables 50 with a protective sheath. The deflection elements 16, the coupling element 70 and further illustrated guide elements are arranged on a base plate 19 which is connected to the housing 10 by means of screws 60. The box 1 can be provided with various fittings by means of the detachable base plate 19, this increasing the flexibility of the box 1.

Figure 4:
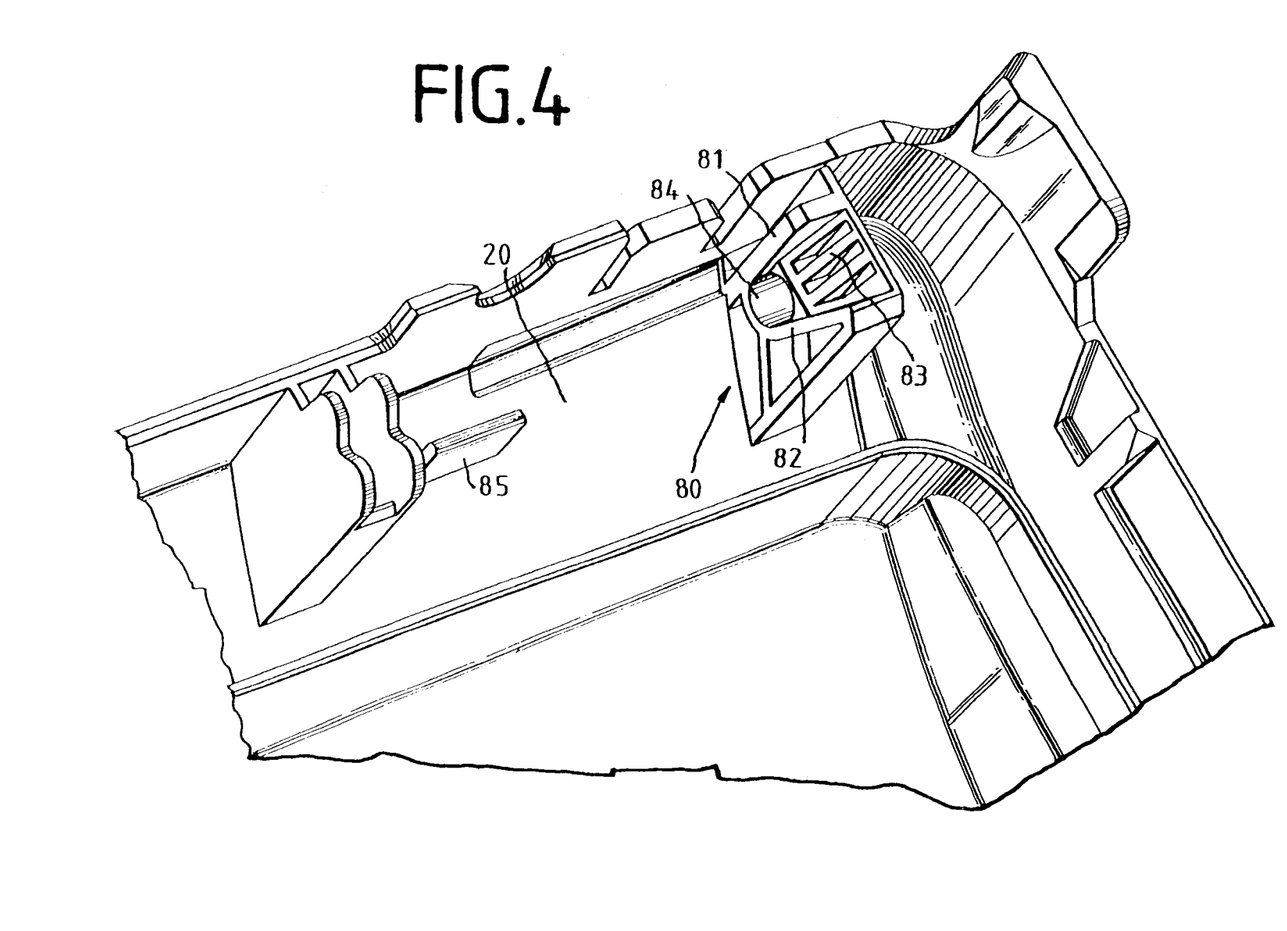
FIG. 4 shows a perspective illustration of a receptacle for a pin element.

In the text which follows, the connection between the cover 20 and the housing 10 will first be explained in greater detail with reference to FIG. 4 to FIG. 6. In this case, FIG. 4 shows a detailed illustration of a holding element 80 (designated receptacle for short in the text which follows) for a pin element which is still to be explained. The receptacle 80 is arranged on the cover 20 and comprises a first side wall 81 and a second side wall 82 and also a slotted rear wall 83 which runs obliquely downward and merges with a blind hole 84. In this case, the second side wall 82 likewise runs obliquely downward in the direction of blind hole 84. A stop edge 85, of which the function is still to be explained, is also illustrated.

Figure 5:
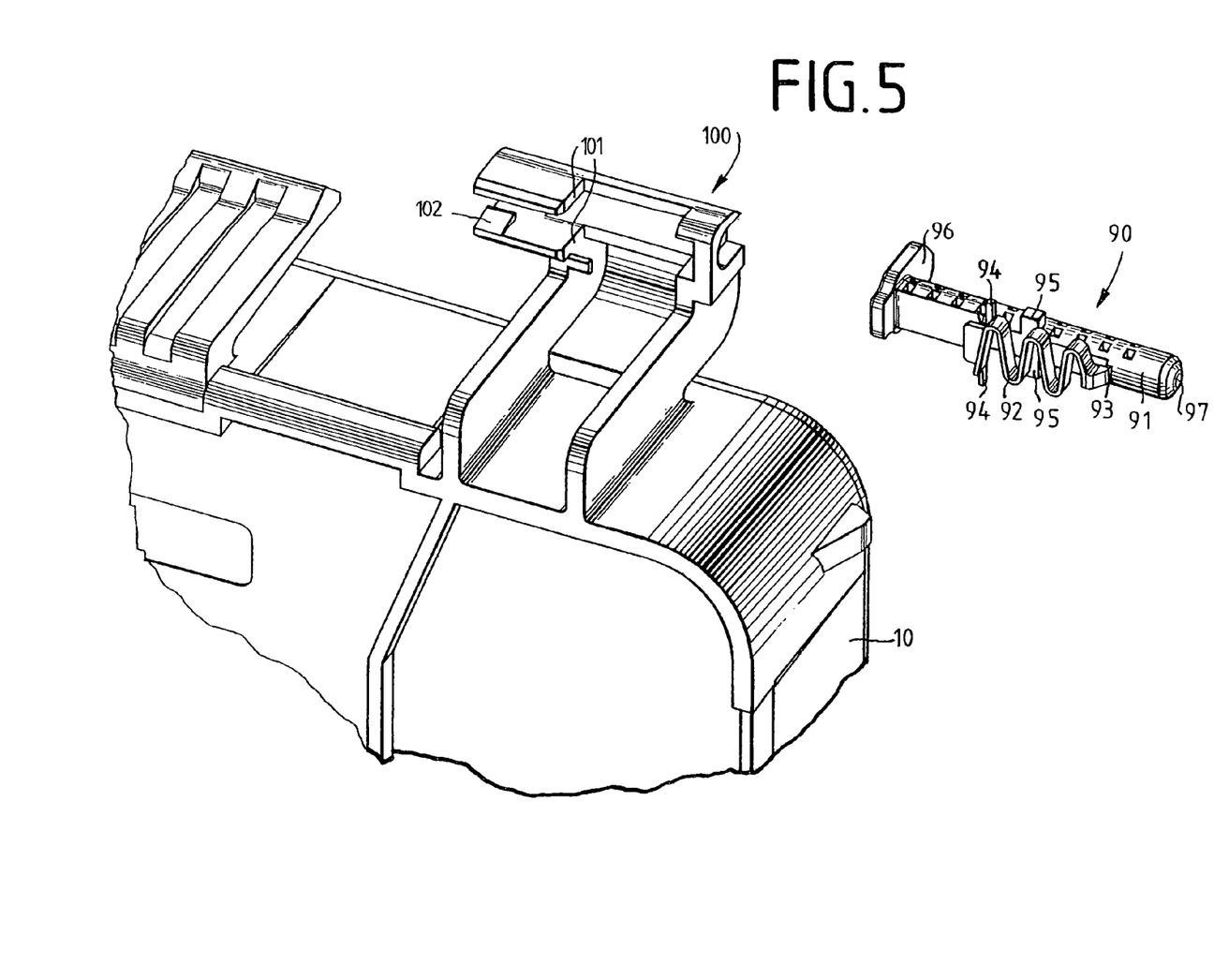
FIG. 5 shows a perspective illustration of a pin element before it is inserted into a pin element holder.

The pin element 90 is illustrated in FIG. 5. The pin element 90 comprises a pin 91 which has a spring element 92 (designated spring for short in the text which follows) arranged on one side. The spring 92 is firmly connected to the pin 91 at a link 93 on one side. At the free end, the spring 92 has two support points 94. Furthermore, the pin 91 has two stop elements 95. Finally, the pin element 90 also has a tab 96. The pin 91 is formed with a rounded portion 97 on that end which is opposite the tab 96.

In this case, the pin element 90 is preferably in the form of an integral injection-molded part.

Figure 3:
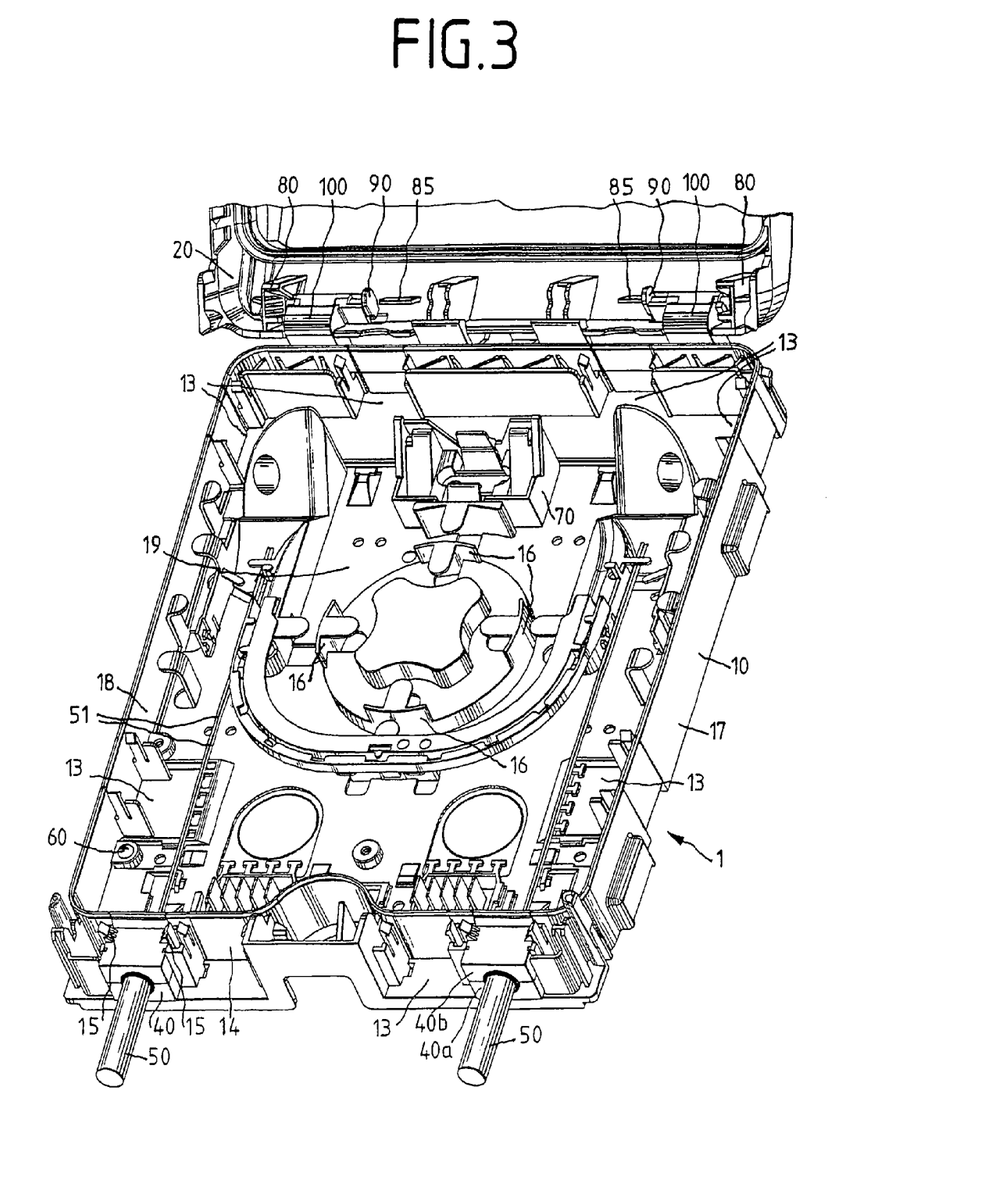
FIG. 3 shows a perspective front view of the box with the cover open.
Figure 6:
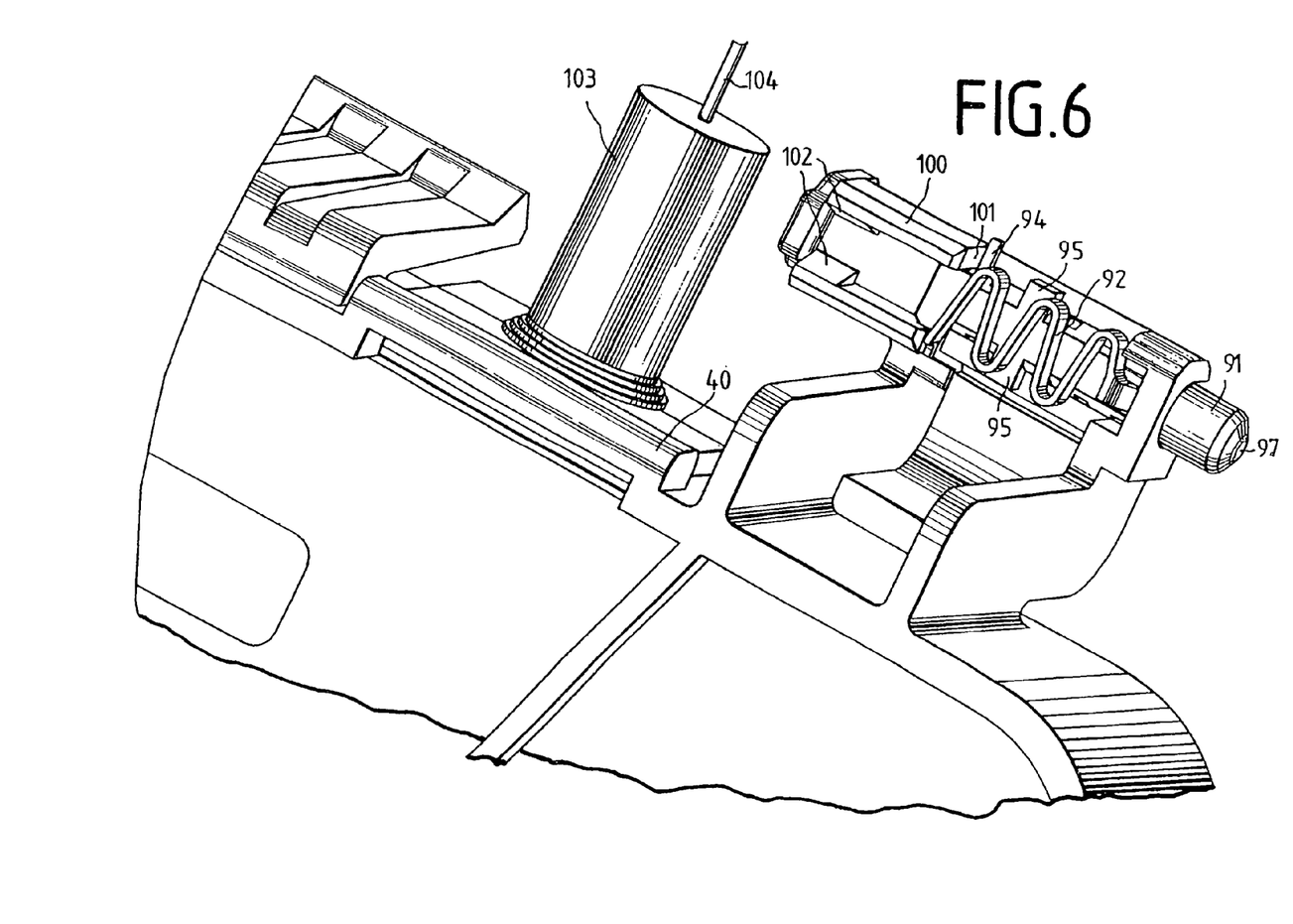
FIG. 6 shows a perspective illustration of the pin element after it has been inserted into the pin element holder.

The pin element 90 is clipped into a pin element holder 100, as is illustrated in FIG. 6, with the support points 94 being supported on stop edges 101. In this case, latching lugs 102 of the pin element holder 100 surround the pin element 90, and therefore said pin element is arranged in a captive manner. FIG. 6 illustrates the state in which the spring is relieved of tension. By virtue of a force in the axial direction, the pin element 90 can be moved in the direction of the stop edges 101, with the spring 92 then being compressed. In this case, the stop elements 95 limit the maximum compression. If the cover 20 with the receptacle 80 is now positioned on the pin element 90, the pin 91 can be easily positioned on account of the inclination of the side 82. If the cover 20 is then pushed further, the rear wall 83 slides along the pin element 90. On account of the inclination of the rear wall, the pin 91 is pushed in and the spring 92 is compressed until the blind hole 84 is reached. The spring 92 is then relieved of tension and the pin 91, by way of its rounded portion 97, enters the blind hold 84. As a result, the cover 20 and the housing 10 are attached. In the attached state with the cover 20 closed, the stop edge 85 prevents movement of the pin element 90, that is to say, when the cover 20 is closed, the pin element 90 cannot be drawn out of the blind hole 84. The pin element 90 is released when the cover 20 is open. In this case, the tab 96 is drawn away from the spring in the axial direction. As a result, the spring is compressed and the pin 91 moves out of the blind hole 84. The cover 20 is therefore unlocked and can be removed from the housing 10. It should be noted here that the pivot axis of the cover 20 is the same as the central longitudinal axis of the pin element 90. The position in which the pin element 90 enters the blind hole 84 is an attached starting position in this case. If the cover 20 is removed, the pin element 90 is in an unattached starting position. In these cases, the spring 92 is respectively relieved of tension or is subject to a defined pretension. The pin element 90 is moved to (at least) a second position, in which the spring 92 is compressed, both by pulling on the tab 96 to remove the cover 20 and conversely when the cover 20 is slid along the inclined rear wall 83. As shown in FIG. 3 in particular, the box has two receptacles 80 and two pin elements 90. FIG. 6 also illustrates a cable 103 with at least one optical waveguide 104, said cable being guided through a sealing element 40. To this end, two receptacles 13 are also arranged on the rear end side.

Figure 7:
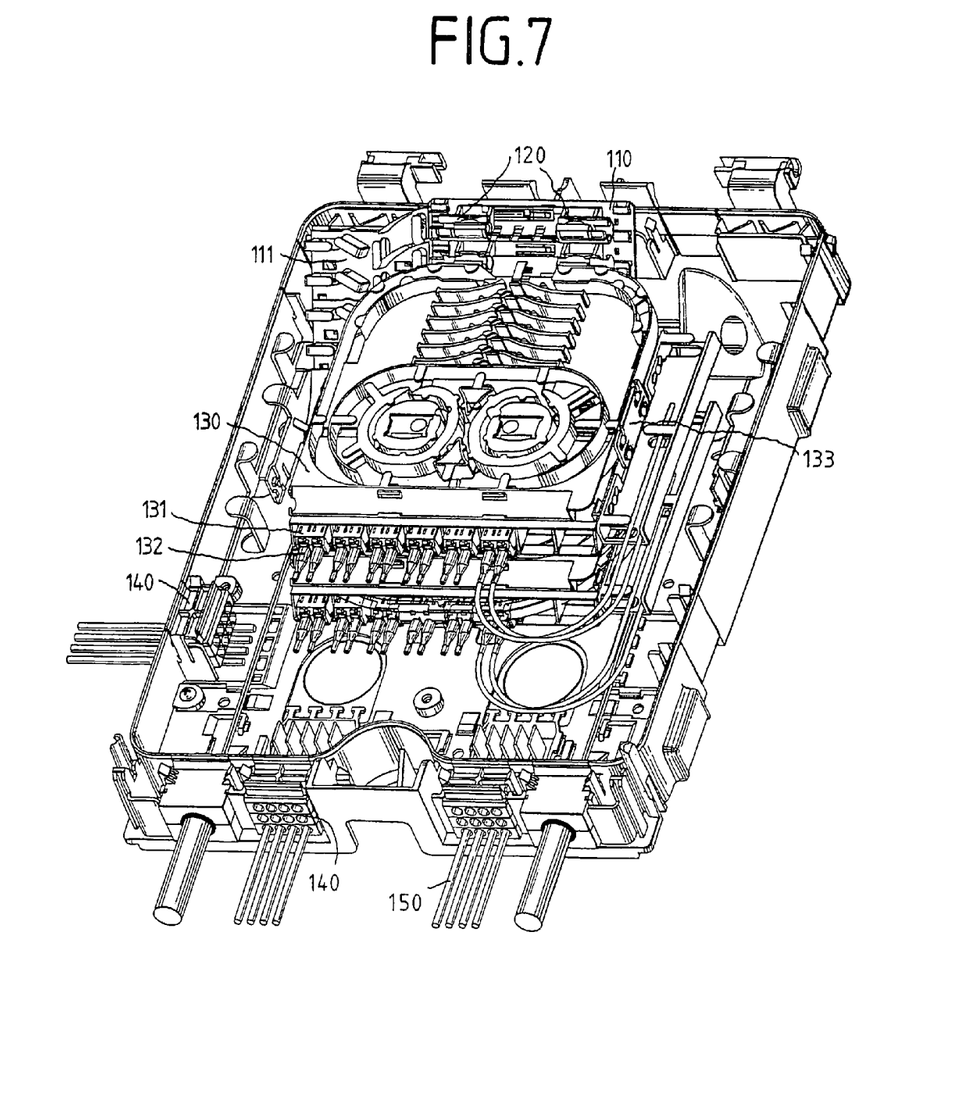
FIG. 7 shows a perspective illustration of a box, which is provided with fittings, without a cover.

FIG. 7 illustrates a perspective view of a fully equipped housing 10. In this case, a pin holder 110, which is preferably set at an angle of approximately 45 degrees in relation to the base plate 19 (see FIG. 3), is latched onto the coupling element 70 (see FIG. 3). Pin elements 120 are attached to the pin holder 110, preferably latched to the pin holder 110. Cassettes 130 are snapped onto these pin elements 120 and said cassettes can then be pivoted about the pin elements 120. In this case, the cassettes 130 have receptacles which snap over the pin elements 120. The pin elements 120 therefore remain fixed when the cassette 130 is pivoted. In this case, the pin elements 120 are in the form of hollow cylinders with a slot, and therefore cores, which are not disturbed by pivoting of the cassettes, can be guided into said slot. To this end, guide elements 111 are arranged on the side of the pin holder 110, it being possible for optical waveguides to be guided into the pin elements 120 by means of said guide elements. The illustrated cassettes are term/splice cassettes. A term/splice cassette comprises a term cassette with adapters 131 for fiber-optic connectors 132 and a splice cassette which is arranged above the term cassette. In this case, the two cassettes are joined to form one unit by means of latching plates 133. Pigtails can then be guided directly into the term cassette via openings in the splice cassettes, with the fiber-optic connectors of the pigtails being inserted into the rear side of the adapters 131. FIG. 7 illustrates two term/splice cassettes, with fiber-optic connectors 132 being inserted on the front side of the adapters 131.

Figure 8:
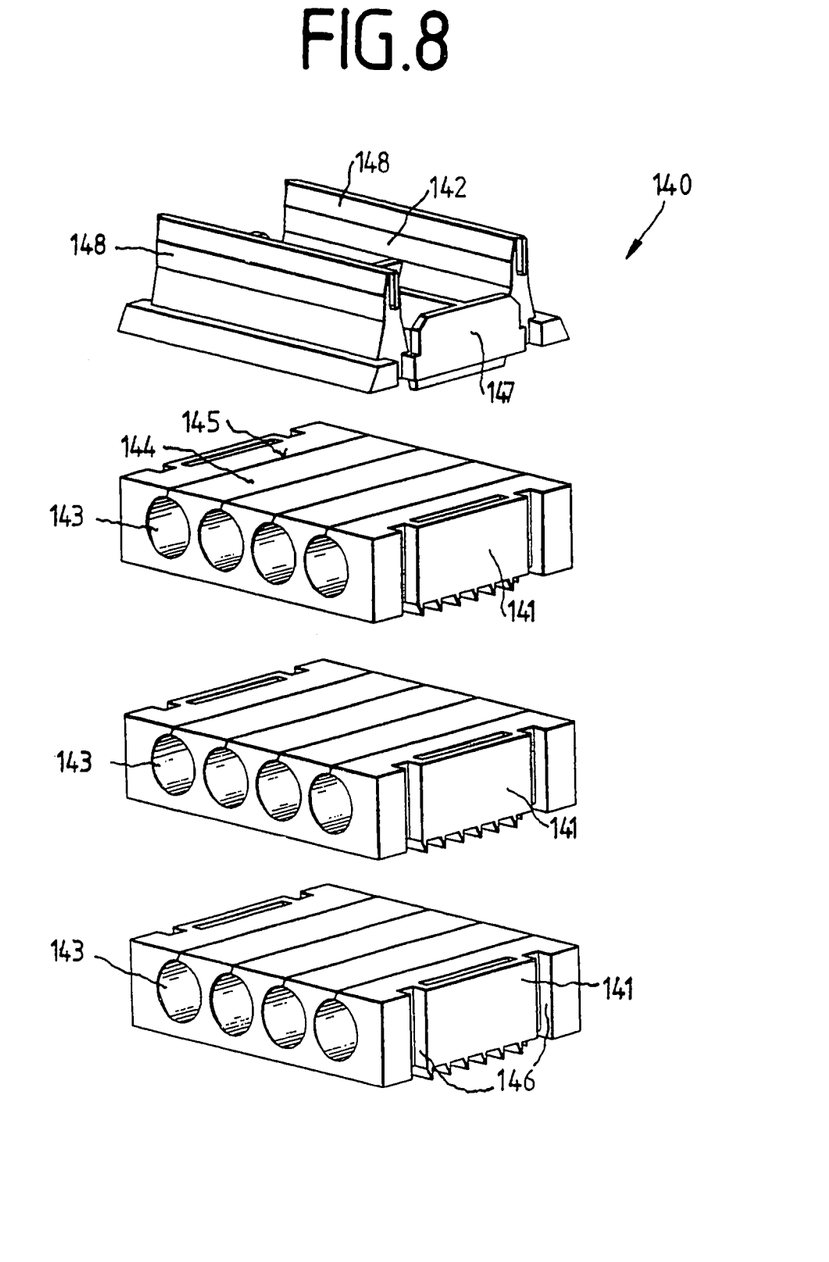
FIG. 8 shows an exploded illustration of a sealing element for patch cord cables.

FIG. 7 also illustrates that two sealing elements 140 are arranged on the front end side 12 and a sealing element 140 for optical waveguides, in particular patch cables, is arranged on side 18. The sealing element 140 is made up of three sealing bodies 141 and an end piece 142 (see FIG. 8). In this case, each sealing body 141 has four cylindrical passages 143, with a slot 145 running from the upper side 144 to the passage 143. Therefore, the sealing body 141 can be bent at the slot 145 and a patch cable 150 with fiber-optic connectors 132, in which case the fiber-optic connectors 132 of said patch cable would not fit through the passage 143, can be inserted into the passage 143. After the cables are inserted, the sealing bodies 141 are plug-connected and finally the end piece 142 is fitted onto the top most sealing body 141. The sealing bodies 141 have further grooves 146, and therefore the sealing element 140 can be mounted at edges of the housing 10. Finally, the latching lugs 15 latch over the webs 147 of the end piece 142. Furthermore, the end piece 142 has sealing lips 148 which terminate with the edge of the housing 10.

Figure 9:
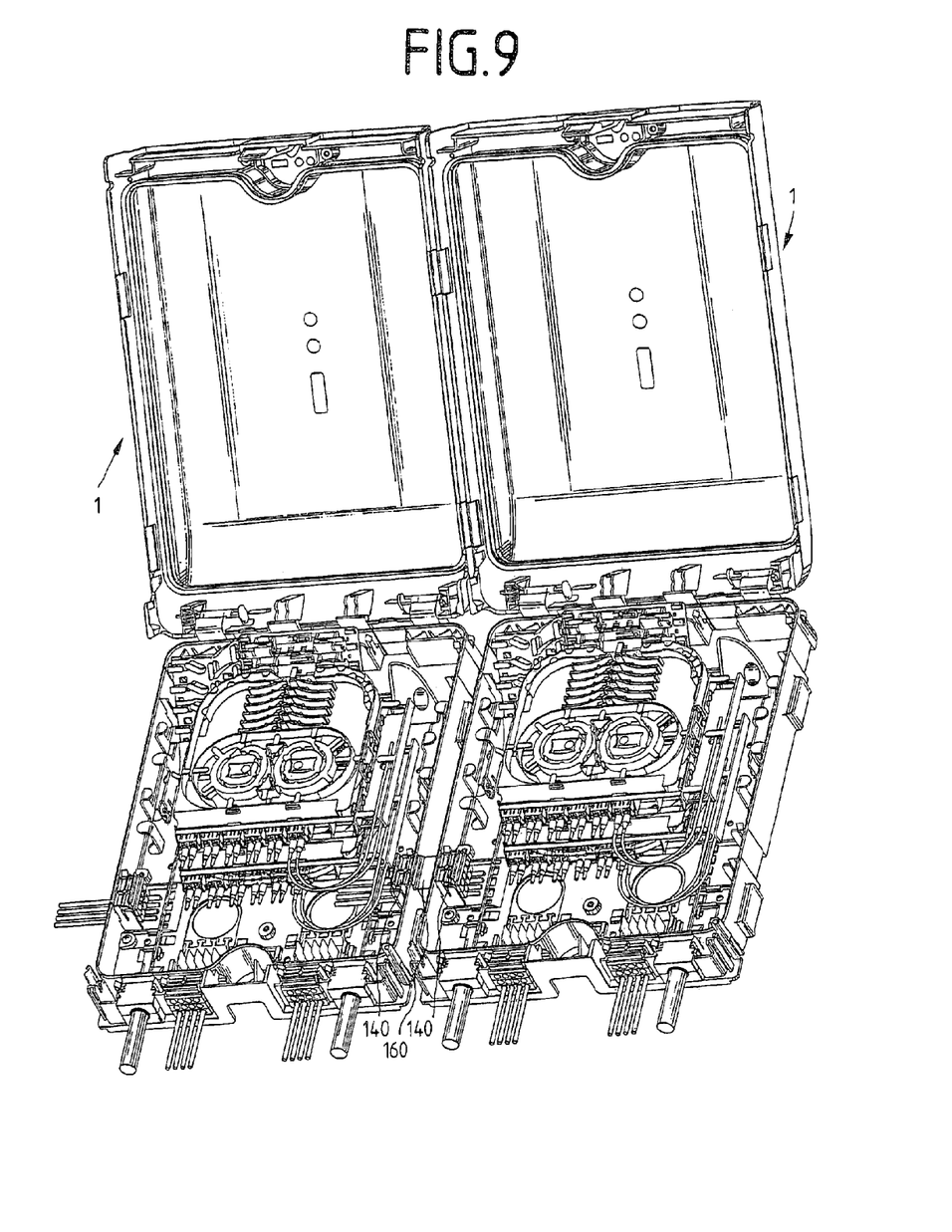
FIG. 9 shows a perspective front view of two boxes which are lined up next to one another.
Figure 10:
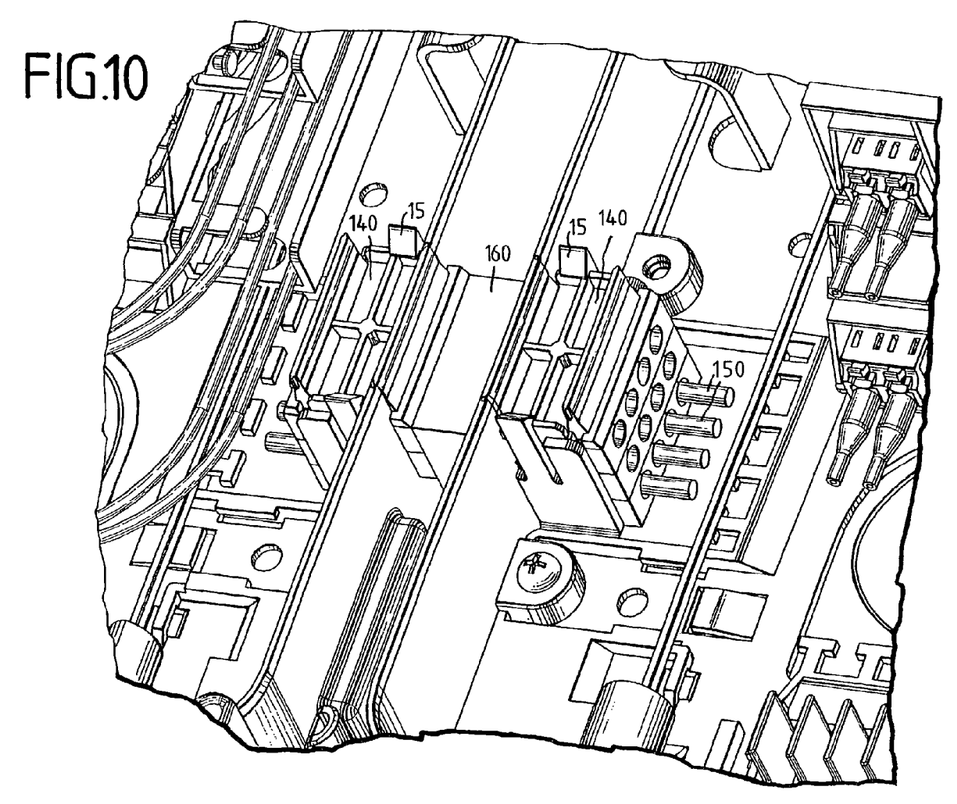
FIG. 10 shows a detailed illustration of the coupling between the boxes.

Finally FIGS. 9 and 10 illustrate how two boxes 1 according to the invention are lined up next to one another. In this case, optical waveguides or patch cables 150 can be guided from a box 1 directly into the adjacent box 1 via the sealing elements 140 which are each arranged at the side. In this case, the optical waveguides or patch cables 150 are guided between the boxes 1 by way of a connecting element 160 with at least one connecting channel. In this case, the connecting element 160 preferably latches together with the sealing-off element 140 in the receptacle 13.

LIST OF REFERENCE SYMBOLS

1 Box
10 Housing
11 Receptacle
12 Front end side
13 Receptacles
14 Peripheral wall
15 Latching lug
16 Deflection element
17, 18 Sides
19 Base plate
20 Cover
21 Rear region
22 Latching tab
23 Latching lug
40 Sealing element
40a, 40b Half-shells
50 Bundled core cable
51 Bundled core
60 Screws
70 Coupling element
80 Receptacle
81 First side wall
82 Second side wall
83 Rear wall
84 Blind hole
85 Stop edge 90 Pin element
91 Pin
92 Spring
93 Link
94 Support points
95 Stop elements
96 Tab
97 Rounded portion
100 Pin element holder
101 Stop edge
102 Latching lugs
103 Cable
104 Optical waveguide
110 Pin holder
111 Guide element
120 Pin elements
130 Cassettes
131 Adapter
132 Fiber-optic connector
133 Latching plates
140 Sealing elements
141 Sealing body
142 End piece
143 Passages
144 Upper side
145 Slot
146 Groove
147 Web
148 Sealing lip
150 Patch cable
160 Connecting element

The invention claimed is:

1. A distribution cabinet for accommodating and laying optical waveguides and/or copper conductors, the distribution cabinet comprising:
at least one lower part and at least one cover, the lower part holding at least one pin element including a pin that is moveable relative to the lower part against a biasing force, and the cover having at least one receptacle for receiving the pin upon attachment of the cover to the lower part, the cover pivoting between an open position and a closed position about the pin along a longitudinal axis of the pin, and wherein the cover detaches from the lower part when the pin is removed from the at least one receptacle, wherein the pin can be displaced relative to the lower part and the cover along the longitudinal axis of the pin.

2. The distribution cabinet of claim 1, wherein the at least one pin element includes at least one spring element configured to exert the biasing force on the pin in a direction parallel to the pivot axis by the at least one spring element if the pin has been displaced out of a starting position relative to the at least one receptacle.

3. The distribution cabinet of claim 2, wherein the at least one spring element is injection-molded onto the at least one pin element.

4. The distribution cabinet of claim 1, wherein the lower part has the at least one receptacle for at least one sealing element, wherein the at least one sealing element is locked to the lower part by the at least one receptacle.

5. The distribution cabinet of claim 1, wherein at least one side wall of the lower part has a predetermined breaking point.

6. The distribution cabinet of claim 1, wherein the lower part has at least one apparatus for holding at least one connecting element.

7. A distribution cabinet for accommodating and laying optical waveguides and/or copper conductors, the distribution cabinet comprising:
a base including a pin holder defining a pivot axis;
a pin element including a pin carried by the pin holder, the pin being slidable along the pivot axis relative to the pin holder between a first position and a second position, the pin element including a spring coupled to the pin, the spring biasing the pin towards the first position; and
a cover defining a hole, the cover being attached to the base such that the pin is received in the hole when the pin is disposed in the first position and is refracted from the hole when the pin is moved along the pivot axis to the second position, the cover being configured to pivot relative to the base about the pivot axis when the pin is disposed in the first position, and the cover being detachable from the base when the pin is disposed in the second position.

8. The distribution cabinet of claim 7, wherein the cover defines a cam surface so that the pin slides over the cam surface when the cover is being attached to the base, wherein the cam surface is configured to move the pin to the second position as the pin slides over the cam surface, and wherein the spring biases the pin to the first position when the pin is aligned with the hole.

9. The distribution cabinet of claim 7, wherein the cover includes a stop edge that prevents movement of the pin.

10. The distribution cabinet of claim 7, wherein the pin extends axially from a first end to a second end, the first end of the pin including a tab, and the second end of the pin defining a rounded portion.

11. The distribution cabinet of claim 10, wherein the tab is configured to facilitate grasping to enable a user to move the pin to the second position.

12. The distribution cabinet of claim 7, wherein the cover includes a holding element that defines the hole, the holding element including—side walls configured to guide the pin to the hole.

13. The distribution cabinet of claim 12, wherein the holding element defines a cam surface extending between the sidewalls, the cam surface leading to the hole.

14. The distribution cabinet of claim 7, wherein the base includes a second pin holder defining the pivot axis and the cover defines a second hole; and wherein a second pin element includes a second pin that is carried by the second pin holder and is slidable along the pivot axis relative to the second pin holder between a respective first position and a respective second position; and wherein the second pin is received in the second hole when the second pin is disposed in the respective first position and is retracted from the second hole when the second pin is moved to the respective second position.

15. A method of detachably securing a cover to a base including a plurality of pin elements that each include a pin, the method comprising:
positioning the cover relative to the base to align the pins of the base with open ends of holding elements of the cover, each holding element having a cam surface leading from the respective open end to a respective hole;
sliding the cover relative to the base so that the pins slide over cam surfaces of the holding elements towards the holes, wherein the pins are moved from extended positions to retracted positions as the pins slide over the cam surfaces; and
continuing to slide the cover relative to the base until the pins snap into the holes to secure the cover to the base in an open position.

16. The method of claim 15, further comprising pivoting the cover relative to the base about the pins until a stop surface of the cover prevents movement of the pins.

* * * * *